United States Patent Office 3,649,658
Patented Mar. 14, 1972

3,649,658
ZINC CHLORINATED DITHIOBENZOATES
Toshiaki Ozaki, Toyonaka-shi, and Haruo Kunihiro, Takatsuki-shi, Japan, assignors to Sumitomo Chemical Company, Ltd., Osaka, Japan
No Drawing. Filed Sept. 24, 1969, Ser. No. 860,791
Int. Cl. C07f 3/06
U.S. Cl. 260—429.9                                     5 Claims

ABSTRACT OF THE DISCLOSURE

Novel zinc chlorinated dithiobenzoates represented by the formula,

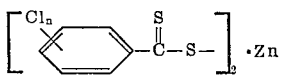

wherein $n$ is an integer of 1 to 5, which may be employable as fungicidal compositions.

---

The present invention relates to a novel zinc chlorinated dithiobenzoate represented by the general Formula I:

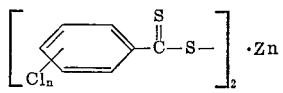

wherein $n$ is an integer of 1 to 5, and a fungicidal composition containing said novel zinc chlorinated dithiobenzoate.

As a higher amount of fruit has been consumed year by year in accordance with the improvement of national dietary life, fruit has been widely cultivated to become a larger part of agricultural production. The prevention of various diseases of fruit plants has been a very important operation in the fruit cultivation producing annual and cash farm products. For example, Blossom blight (*Sclerotinia mali*) and Alternaria leaf spot (*Alternaria mali*) are a main disease of apple. Especially the disease due to *Alternaria mali* is very hard to cure completely. At present, a bordeaux mixture and organic sulfur compounds are used to control these diseases. However, these compounds have advantages and disadvantages with respect to effectivness, phytotoxicities and costs.

The zinc chloro-dithiobenzoate of the present invention has a very high effectiveness for preventing such diseases caused by *Alternaria mali*, and further the compounds show a strong microbiocidal action against *Alternaria kikuchiana*, *Pyricularia oryzae*, *Cochliobolus miyabeanus* and the like.

Further, since fruit is usually provided to general consumers as uncooked goods, applications of poisonous materials for preventing such disease may cause serious problems with regard to poisonous residues for human and animals. The compounds of the present invention do not contain any poisonous heavy metals such as mercury, arsenic and the like, so that they are handled very safely. Thus, they have remarkable advantages as agricultural and horticultural fungicidal agents. The present inventors have for the first time discovered that the novel compounds of the present invention have superior and valuable properties useful for employment as such agents.

The novel zinc chlorinated dithiobenzoate of the present invention is produced in accordance with the following reaction:

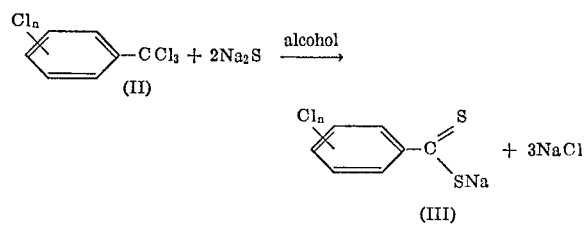

wherein $n$ is the same as defined above. Hence, chlorinated benzotrichloride represented by the general Formula II is reacted with sodium sulfide in an alcoholic solvent to produce sodium chlorinated dithiobenzoate represented by the general Formula III and then the thus obtained sodium chlorinated dithiobenzoate is reacted with an appropriate zinc salt such as zinc sulfate, zinc chloride, zinc acetate or the like in a solution of water and alcohol. By this process, a high yield of the objective zinc chlorinated dithiobenzoate having the Formula I can easily be obtained. The typical compounds will be disclosed hereinunder. However, it is not intended, of course, to restrict the present invention to such compounds.

(1)

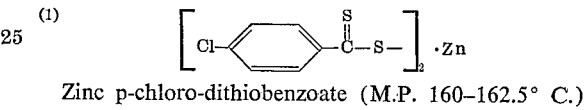

Zinc p-chloro-dithiobenzoate (M.P. 160–162.5° C.)

(2)

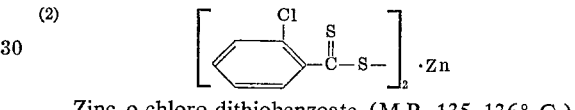

Zinc o-chloro-dithiobenzoate (M.P. 135–136° C.)

(3)

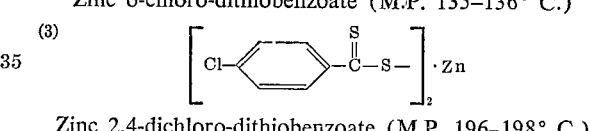

Zinc 2,4-dichloro-dithiobenzoate (M.P. 196–198° C.)

(4)

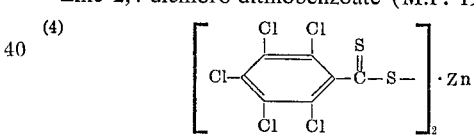

Zinc 2,3,4,5,6-pentachloro-dithiobenzoate (M.P. 285–287° C.)

The present compounds may be employed either as they are without any addition of other materials, or in the form of a mixture with suitable carrier to be handled easily as an agricultural and horticultural fungicide. Usually these compounds may be used in any one of various prepared forms such as dust, wettable powder, emulsifiable concentrate, granule, oil spray and aerosol and the like. Alternatively, the present compounds may be used in a mixture with organic sulfur compounds, organic chlorine compounds, organic phosphorus compounds, copper compounds and organic arsenic fungicidal agents such as zinc dimethyldithiocarbamate, N-tetrachloroethyl-thiotetrahydrophthalimide, pentachlorobenzyl alcohol, O-ethyl-S, S-diphenylphosphordithiorate, N-(3,5-dichlorophenyl) succinimide, N-(3,5-dichlorophenyl) itaconimide and iron methylarsenate, as well as with antibiotics. Further, they may be used in a mixture with insecticides such as organic chlorine compounds, organic phosphorus compounds and carbamate compounds, for instance, BHC, DDT, parathion, marathion, dimethoate, EPN, NAC, Sumithion (trade name of product manufactured by Sumitomo Chemical Co.), and 3,4 - dimethylphenyl-N-methylcarbamate with or without the addition of the above fungicidal agents, or in a mixture with agricultural chemicals such as herbicides, nematocides, acaricides, or with fertilizers. A synergistic effect may also be expected by combination.

The present invention will be explained in detail with respect to the following examples. It should be noted that the present invention is not restricted to such examples but modifications can be made widely as to sorts of additives and mixing ratios.

EXAMPLE 1

72.0 g. (0.3 mol) of $Na_2S \cdot 9H_2O$ and 250 cc. of 99% ethanol were each introduced into a 500 cc. four necked flask and the mixture was stirred for 20 minutes at a temperature of 40° to 45° C. At the same level of temperature 34.5 g. (0.15 mol) of p-chlorobenzotrichloride was dropwise added thereto within 30 minutes.

The reaction mixture was stirred for 2 hours at a temperature of 40° to 45° C. and thereafter cooled to room temperature to precipitate sodium chloride, which was separated by filtration.

The filtrate was mixed with 800 cc. of water to form aqueous sodium p-chlorodithiobenzoate solution.

An aqueous zinc sulfate solution previously prepared by dissolving 21.5 g. (0.075 mole) of $ZnSO_4 \cdot 7H_2O$ in 100 cc. of water, was dropwise added to the aqueous sodium p-chloro-dithiobenzoate solution to precipitate crystals, which were separated by filtration, washed with water and dried.

Thus, 54.2 g. of zinc p-chloro-dithiobenzoate was obtained in yield of 82.0%, M.P. 160–162.5° C.

*Elementary analysis.*—Calculated (percent): Cl, 8.05; S, 14.5; Zn, 14.8. Found (percent): Cl, 8.1; S, 14.5; Zn, 15.0.

In the same way as mentioned above, except that o-chlorobenzotrichloride, 2,4-dichlorobenzotrichloride and 2,3,4,5,6-pentachlorobenzotrichloride were employed in place of p-chlorobenzotrichloride, the corresponding zinc chlorodithiobenzoates were respectively obtained.

EXAMPLE 2

Dust composition 3 parts of zinc p-chlorodithiobenzoate were mixed and pulverized with 97 parts of clay-talc to prepare a dust composition containing 3% of the active component. The thus obtained composition can be dusted as it is in application.

EXAMPLE 3

Dust composition 3 parts of zinc o-chlorodithiobenzoate and 2 parts of zinc p-chlorodithiobenzoate were fully mixed and pulverized with 95 parts of clay to prepare a dust composition containing 5% of the active components. The thus obtained composition can be dusted as it is in application.

EXAMPLE 4

Wettable powder

50% zinc 2,3,4,5,6-pentachlorodithiobenzoate were fully mixed and pulverized with 5 parts of alkylbenzensulfonic acid compound as a wetting agent, and 45 parts of diatomaceous earth to prepare a wettable powder composition containing 50% of the active component. The thus obtained composition can be sprayed after dilution with water for application.

EXAMPLE 5

Wettable powder 40 parts of zinc 2,4-dichlorodithiobenzoate were thoroughly mixed and pulverized with 5 parts of a higher alcohol sulfonic acid compound as a wetting agent and 55 parts of diatomaceous earth to prepare a wettable powder composition containing 40% of the active components. The thus obtained composition can be sprayed after dilution with water for application.

The present invention will be explained with respect to typical test results to prove its outstanding preventive and exterminative effects on diseases.

TEST EXAMPLE 1

A diluted solution of each sample compound having a predetermined concentration was prepared. The effective concentration required for preventing not lower than 95% of germination of the spores tested ($LC_{95}$ value: p.p.m.) in accordance with testing method of the inhibition of the germination of spores on a slide was determined. The results are shown in Table 1.

TABLE 1

| | Fungus tested | | | |
|---|---|---|---|---|
| Compound | Alternaria mali | Alternaria kikuchiana | Cochliobolus miyabeanus | Pyricularia oryzae |
| Zinc p-chlorodithiobenzoate | 20 | 20 | 2 | 2 |
| Zinc o-chlorodithiobenzoate }<br>Zinc p-chlorodithiobenzoate } (an equimolal mixture) | 20 | 20 | 2 | 2 |
| Zinc 2,4-dichloro-dithiobenzoate | 20 | 20 | 20 | 8 |

TEST EXAMPLE 2

From an apple tree (Variety: India), a new treetop was cut off and inserted in a bottle. A solution of each sample composition of wettable powder type having a predetermined concentration was sprayed over the treetop. Then, after one day, a suspension of spores of *Alternaria mali* was sprayed to inoculate on the treetop, which was examined as to the degree of the disease attack after holding for an additional two days at a room temperature of 27–30° C. in the green house. The results are shown in Table 2, wherein the degree of the damage is expressed by an index of 0 to 4 corresponding to attack conditions as follows.

| Index: | Degree of the damage |
|---|---|
| 4 | Extremely heavy. |
| 3 | Much. |
| 2 | Moderate. |
| 1 | A little. |
| 0 | None. |

TABLE 2

| | Concentration of effective ingredient (p.p.m.) | | |
|---|---|---|---|
| Chemicals | 250 | 125 | 62.5 |
| Zinc p-chloro-dithiobenzoate | 0 | 0 | 1 |
| Zinc o-chloro-dithiobenzoate | 0 | 0 | 1 |
| Zinc 2,4-dichloro-dithiobenzoate | 0 | 0 | 1 |
| Zinc pentachloro-dithiobenzoate | 0 | 1 | 2 |
| Comparison: | | | |
| Zinc dithiobenzoate | 0 | 2 | 4 |
| Dailbordeaux [1] (Trade name) | 0 | 1 | 3 |
| Monox [2] (Trade name) | 0 | 1 | 3 |

[1] Dailbordeaux—containing ziram 50% TMTD 30%.
[2] Monox—containing ziram 50%, EMSC 30%.

NOTE:
Ziram=Zinc dimethyl dithiocarbamate;
TMTD=Tetramethyl thiuram disulfide;
EMSC=Bis(dimethyl dithio carbamoyl ethylene diamine.

TEST EXAMPLE 3

A solution of each sample composition of wettable powder type having a predetermined concentration was prepared and tested on the farm with respect to the prevention of Alternaria leaf spot according to the following procedure:

Variety: India young tree of five years age.
Scale: Three plot replicate with five trees in a plot.
Spray of compositions: Spray was carried out by means of a power sprayer in an amount of 10 l./plot with the total spraying times of 6, i.e., May 18, May 28, June 7, June 18, July 1 and July 9.

Examination: The number of disease spots on 10 upper perfectly developed leaves on 10 new treetops of each tree was counted. The results are shown in Table 3.

TABLE 3

| Chemicals | Concentration of effective ingredient (p.p.m.) | Ratio of leaves infected (percent) | Number of disease spots per 10 leaves | Phytotoxicity |
|---|---|---|---|---|
| Zinc p-chloro-dithio-benzoate | 1,000 | 51.2 | 9.7 | |
| Zinc 2,4-dichloro-dithio-benzoate | 1,000 | 63.4 | 11.0 | |
| Zinc pentachloro-dithio-benzoate | 1,000 | 62.7 | 10.8 | |
| Zinc dithio-benzoate | 1,000 | 86.9 | 43.5 | |
| Deran (Trade name) | 1,000 | 72.8 | 24.7 | |
| Non-treated | | 93.2 | 64.9 | |

NOTE.—Deran contains 75% of 2,3-dinitro-1,4-dithiaanthraquinone.

As clearly seen from the above, the present compounds have extremely superior effects on the prevention of disease in comparison with commercially available chemicals and known compounds.

What is claimed is:

1. A novel zinc chlorinated dithiobenzoate represented by the general formula:

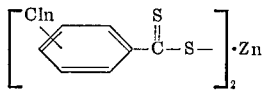

wherein $n$ is an integer of 1 to 5.
2. Zinc p-chloro-dithiobenzoate.
3. Zinc o-chloro-dithiobenzoate.
4. Zinc 2,4-dichloro-dithiobenzoate.
5. Zinc 2,3,4,5,6-pentachloro-dithiobenzoate.

References Cited

UNITED STATES PATENTS

| 1,440,962 | 1/1923 | Cadwell | 260—429.9 X |
| 2,289,649 | 7/1942 | Hardman | 260—502.6 |
| 2,494,355 | 1/1950 | Paul et al. | 424—289 |
| 2,854,325 | 9/1958 | Searle | 260—502.6 |
| 3,385,875 | 5/1968 | Kaplan | 260—429.9 |

FOREIGN PATENTS

| 1,274,121 | 8/1968 | Germany. |

OTHER REFERENCES

Chemical Abstracts, vol. 69, article 86571w (1968).

JAMES E. POER, Primary Examiner

H. M. S. SNEED, Assistant Examiner

U.S. Cl. X.R.

424—289